United States Patent [19]
Hessler et al.

[11] Patent Number: 5,172,393
[45] Date of Patent: Dec. 15, 1992

[54] CIRCUIT ARRANGEMENT FOR CHANNEL-SPECIFIC PROCESSING OF A MULTI-CHANNEL INPUT SIGNAL

[75] Inventors: Peter Hessler, Erlangen; Manfred Schmidt, Salz; Bernd Selbach, Eckental; Michael Behrens, Nuremberg, all of Fed. Rep. of Germany

[73] Assignee: U.S. Philips Corporation, New York, N.Y.

[21] Appl. No.: 590,399

[22] Filed: Sep. 28, 1990

[30] Foreign Application Priority Data

Sep. 30, 1989 [DE] Fed. Rep. of Germany ....... 3932801

[51] Int. Cl.⁵ .................... H04B 14/04; H04J 3/24
[52] U.S. Cl. ....................................... 375/25; 375/28; 370/60; 370/94.1; 370/99; 379/202; 178/71 R
[58] Field of Search .................. 375/25, 28; 370/60, 370/85.6, 94.1, 99, 112, 62; 178/71 R, 71 L; 379/202

[56] References Cited

U.S. PATENT DOCUMENTS 4,434,485 2/1984 Huffman et al. ................. 178/71 R
4,597,074 6/1986 Demichelis et al. .............. 370/99
4,797,654 1/1989 Young et al. ..................... 370/60

Primary Examiner—Curtis Kuntz
Assistant Examiner—Young Tse
Attorney, Agent, or Firm—Leroy Eason

[57] ABSTRACT

A circuit arrangement for channel-specific processing of a multi-channel input signal which may consist of two types of encoded signals, a first type wherein all channel signals are encoded by a bit-oriented method (e.g., delta modulation) and a second type wherein all channel signals are encoded by a character-oriented method (e.g., PCM). An interface process (SSP), to which the input signal is applied, is coupled to a bidirectional interface (BIS) for signals of the first type and which is controllable by means of write and read addresses, and is also coupled to at least two such bidirectionally controllable interfaces (BI0, BI1, ... BI7) for signals of the second type. The latter interfaces are respectively coupled to respective transcoder processors (AP0, AP1, ... AP7). One or more data outputs of the interface (BIS) for signals of the first type are respectively coupled to respective ones of the transcoder processors (AP0, AP1, ... AP7). The transcoded channel signals produced by such processors are transmitted via the interfaces (BIS, BI0, ... BI7) to the interface processor (SSP), which combines them into a multi-channel output signal.

1 Claim, 1 Drawing Sheet

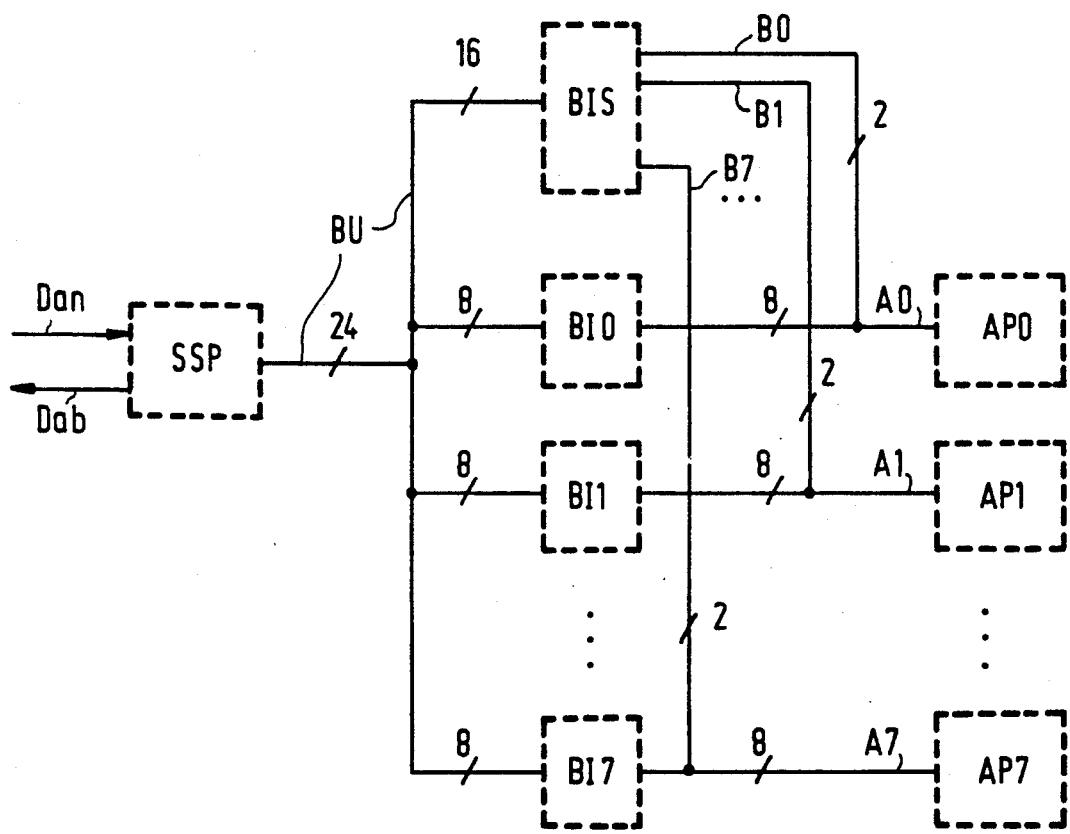

CIRCUIT ARRANGEMENT FOR CHANNEL-SPECIFIC PROCESSING OF A MULTI-CHANNEL INPUT SIGNAL

BACKGROUND OF THE INVENTION

1. Field of The Invention

The invention relates to a circuit arrangement for channel-specific processing of a multi-channel input signal that may consist of two types of encoded signals, a first type wherein all channel signals are encoded by a bit-oriented method and a second type wherein all channel signals are encoded by a character or byte-oriented method.

2. Description of the Related Art

Circuit arrangements of this type are used, for example, in transmission systems which are capable of transmitting the two types of signals. The two types of signals are distinguished by the different encoding methods according to which they have been encoded. The two methods of encoding which are specifically considered here are PCM-encoding (byte-oriented) and all types of delta modulation (bit-oriented).

By channel-specific processing is meant that the signal of a specific channel is to be processed according to a specific protocol and that this protocol may vary from one channel to another. The word "processing" refers, for example, to the filtering of a channel signal—which will be more extensively discussed hereinbelow—or the transcoding of a signal of the first type into a signal of the second type and vice versa.

The channel-specific processing of a multi-channel signal having a frame structure would be readily possible by means of an extremely fast signal processor provided that such a processor may be inserted at the desired spot at justifiable cost. However, the cost of a single processor is generally too high or its calculation capacity too low. Consequently multiprocessor systems are generally used.

SUMMARY OF THE INVENTION

It is an object of the invention to provide for the aforesaid purpose a circuit arrangement comprising processors operating in parallel.

This object is achieved by means of a circuit arrangement which includes an interface processor to which the multi-channel input signal is applied. The interface processor (SSP) is coupled to a bidirectionally controllable interface (BIS) for signal of the second type. The latter interfaces (BI0, BI1, . . . BI7) are coupled to respective processors (AP0, AP1, . . . AP7), and data outputs of the BIS interface are also respectively coupled to respective ones of such processors. The channel signals produced by those processors are transmitted via the interfaces BI0, BI1, . . . BI7 to the interface processor SSP, which combines them into a multi-channel output signal.

The circuit arrangement according to the invention is advantages in that only simple control software is necessary for the interface processor. Furthermore, the software for all processors may be indentical if they all have to handle the same kind of signal processing. For that matter, processors having the same hardware will have the same connections.

A further advantage is that synchronisation of all write and read operations of the processors is facililated; it is determined only by the software of the interface processor. Such synchronisation is necessary, for example, if the processed data of the processors are components of an audio-conference signal and the processors are connected with one another (cf. Published West Germana Patent DE 39 01 909 concerning the conference circuit) by means of further (not shown in the FIGURE) interfaces.

BRIEF DESCRIPTION OF THE DRAWINGS

The invention will be further explaned with reference to the sole drawing FIGURE showing a schematic diagram of the circuit arrangement according to the invention.

DESCRIPTION OF THE PREFERRED EMBODIMENTS

In the FIGURE a frame-structured PCM input signal—termed a signal of the second type in this context—is applied to an interface processor SSP over a line Dan. Each channel signal of the PCM input signal has a 64 kbit/s bitrate.

Through a special channel, not shown, the interface processor SSP is informed by means of an identification code that the input signal is a signal of the second type. The input signal is to be transcoded by the circuit in the FIGURE into a signal of the first type, that is to say, a signal which is bit-oriented. In the present example the bit-oriented signal will be a DCDM signal (Digitally coded Delta-Modulation Signal) is having a bitrate of 16 kbit/s per channel.

The actual transcoding is effected by means of eight processors AP0 to AP7. The data flow to and from the processors AP0 to AP7 to and from buslines BU, B0, B1, . . . , B7 and A0, A1, . . . , A7 and also over the bidirectional interfaces BIS, BI0, BI1, . . . , BI7 is controlled by the interface processor SSP through control lines (not shown in the FIGURE). By means of special addresses the interface processor SSP can activate for write and read accesses the working memories of the processors AP0, AP1, . . . , AP7 via the interfaces BIS, BI0, . . . , BI7.

In the present example the input signal consists of 32 PCM channels, whose data words are cyclically written into the processors over eight parallel data lines of the bus system BU and also over the lines A0 to A7 into the working memories of the processors AP0 to AP7. Since there are only eight processors, the data of each four channels are transcoded by one processor due to which its calculation capacity (for example, commercially that of the avavible DSP56001 processor) is almost exhausted.

Over dual lines B0, B1, . . . B7 the bits of the first 16 transcoded channel signals are transmitted in parallel and simultaneously from the processor to the interface BIS for signals of the first type, and from there are written into the interface processor SSP over 16 parallel lines. This process is repeated for the remaining 16 transcoded channel signals within one frame of the transcoded multi-channel signal.

The processor SSP performs a parallel-to-serial conversion of the data, arranges them in frames and supplies them as output signals over the output line Dab.

The time-dependent coordination of all the processes discussed is effected by control signals supplied by the interface processor SSP. The interface processor SSP itself is synchronised with the clock of the incoming and outgoing serial data. Since synchronisation and timing of the various modules play only a minor role in the present application, those features will not be discussed any further.

We claim:

1. A circuit arrangement for processing of a multi-channel input signal thereto having channel signals which are encoded in accordance with either a first or a second type of encoding, the first type being bit-oriented and the second type being character-oriented; said circuit comprising:

an interface processor (SSP) for receiving the multi-channel input signal;

a bi-directionally controllable interface (BIS) of a first type for transferring channel signals of the first type, and a plurality of bi-directionally controllable interfaces (BI0, BI1 ... BI7) of a second type for transferring signals of the second type, the transmission direction of each interface being controlled by said interface processor depending on whether channel signals are to be supplied to such interface by the interface processor or are to be received from such interface by the interface processor;

a plurality of transcoder processors for receiving and processing the channel signals, the processing including conversion to the opposite type encoding from that of the received channel signals;

a first set of channel busses for coupling said interface of the first type to each of the transcoder processors, said first set of channel busses being adapted to simultaneously convey in parallel encoded channel signals of said first type between such interface and all of said transcoder processors;

a second set of channel busses for coupling said interfaces of the second type respectively to the respective transcoder processors, each of said second set of channel busses being adapted to convey a channel signal of the second type; and a third set of channel busses for respectively coupling each of said interfaces to said interface processor;

said interface processor being adapted to synchronize the directions of said interfaces and the channel signal processing operations of said transcoder processors so that:

(i) channel signals of an input signal of the second type are conveyed via the interfaces of the second type to the transcoder processors, the resulting processed signals of the first type produced thereby being conveyed at least partially in parallel to said interface processor via the interface (BIS) of the first type; and (ii) channel signals of an input signal of the first type are conveyed at least partially in parallel via the interface (BIS) of the first type to the transcoder processors, and the resulting processed signals of the second type produced thereby are respectively conveyed to said interface processor via the respective interfaces of the second type;

the channel signals received by said interface processor from the transcoder processors being combined by the interface processor to form a multi-channel output signal of said circuit arrangement.

* * * * *